United States Patent [19]

Golding et al.

[11] 4,366,067

[45] Dec. 28, 1982

[54] METHOD AND APPARATUS FOR REMOVAL AND RECOVERY OF OIL

[76] Inventors: Gordon R. Golding, 1 Oak Ave., Browns Mills, N.J. 08015; Richard J. Boaggio, 1404 Spruce Ave., Kirkwood, N.J. 08043

[21] Appl. No.: 198,762

[22] Filed: Oct. 20, 1980

[51] Int. Cl.³ ............................................... C02F 1/28
[52] U.S. Cl. .................................. 210/671; 210/693; 210/242.4; 210/924
[58] Field of Search .................... 210/924, 242 S, 671, 210/693, 502, 484

[56] References Cited

U.S. PATENT DOCUMENTS

| | | | |
|---|---|---|---|
| 3,657,125 | 4/1972 | Strickman | 210/924 |
| 3,679,058 | 7/1972 | Smith | 210/924 |
| 3,739,913 | 6/1973 | Bogosian | 210/924 |
| 3,997,467 | 12/1976 | Jederstrom | 210/924 |
| 4,039,489 | 8/1977 | Fletcher | 210/924 |
| 4,065,923 | 1/1978 | Preus | 210/924 |
| 4,111,813 | 9/1978 | Preus | 210/924 |
| 4,183,984 | 1/1980 | Browers et al. | 210/924 |
| 4,230,566 | 10/1980 | Loudree | 210/924 |

*Primary Examiner*—Ivars C. Cintins

[57] ABSTRACT

Bags or booms of porous material filled with an oil adsorbant, particulate polyisocyanurate synthetic foam material are used to enclose and adsorb oil spilled on water or hard surfaces.

8 Claims, 4 Drawing Figures

METHOD AND APPARATUS FOR REMOVAL AND RECOVERY OF OIL

BACKGROUND OF THE INVENTION

This invention relates to an oil spill cleanup and recovery method and articles for use in said method.

Accidental oil spills have become a very costly occurrence, and a serious environmental danger.

Various inorganic, natural organic, and synthetic materials have been tried for controlling these oil spills. Some of these materials must be disposed of by burning or other means after cleanup. Others, such as detergents and emulsifying agents work by dispersing the oil in solution with the body of water. A third group, for example polymeric foams and liquids, absorb the oil. Among the polymeric foams, the generally recognized best type previously suggested has been polyurethane.

Various prior art systems which have been suggested suffer from one or more problems, complications, and disadvantages.

Yahnke, U.S. Pat. No. 3,578,585, showed a rotating cylinder having a porous outer layer made of polyurethane to absorb oil and a roller means to apply pressure to squeeze the oil.

According to Johnston, U.S. Pat. No. 3,617,551, a flow through chamber containing a polyurethane foam cartridge can be used. Johnston's device also involves a piston-like member to squeeze the foam to recover the absorbed oil.

In Miranda, U.S. Pat. No. 3,886,067, oil sliks are controlled by spraying reactive polyurethane resin-forming materials from a plane or boat onto the spill. The polyurethane foam particles react with and bind the oil to form foam particles. No method of recovery of the foam particles and the entrapped oil is disclosed.

According to Buckley et al., U.S. Pat. No. 3,539,508, a pair of spaced, revolving pickup members dip into the liquid oil spill. One of the cylinders has a polyurethane foam surface, whereas the other has a smooth polyethylene surfaces.

According to De Young, U.S. Pat. No. 3,888,766, oil spills are removed by using a cellular material impregnated with a hydrophobic and oleophilic sealant. Specific cellular materials mentioned by De Young are asbestos, perlite powder, talc, volcanic ash, vermiculite, ground corn cob, wood fiber, fiberboard, hay, sawdust, straw, open cell polyurethane, urea formaldehyde, polyethylene, polypropylene, and polystyrene. Also, cellulose fiber-perlite mixtures, plastic shavings, refuse compost, and mixtures of synthetic fibers.

The polyurethane foams used for oil spill cleanup in the prior art are, according to the references, open celled.

To date, none of the prior oil absorbing systems is completely satisfactory because of certain problems. Polyurethane foam is not hydrophobic enough to avoid picking up undue amounts of water along with the oil when used to control oil spills. Furthermore, storage of polyurethane foam can be dangerous and hazardous to its flamability. Also, the general methods of use of the foams previously suggested are either too complex and, hence, expensive and cumbersome in use, or are ineffective and labor intensive.

SUMMARY OF THE INVENTION

It is therefore an object of the present invention to provide an efficient, easily deployable method of cleaning up oil spills and recovering the oil. A further object is to provide a safer system for oil recovery than previously available. A further object of the invention is to provide an environmentally acceptable method of cleaning up oil spills in a manner which allows the oil to be recovered.

These objects, and others which will become apparent to those skilled n the art from reading the following disclosure, are achieved by the present invention which consists of bags or booms of polyisocyanurate closed cell foam particles which can be readily placed in or around the area of an oil spill. The bags or booms can be tied or chained together for quick and efficient deployment and recovery. The polyisocyanurate closed cell foam is more hydrophobic than polyurethane foam, less flamable, and more efficient at picking up all viscosities of spilled oil when minimizing the water pickup.

DETAILED DESCRIPTION OF THE INVENTION AND THE PREFERRED EMBODIMENTS

Figure 1:
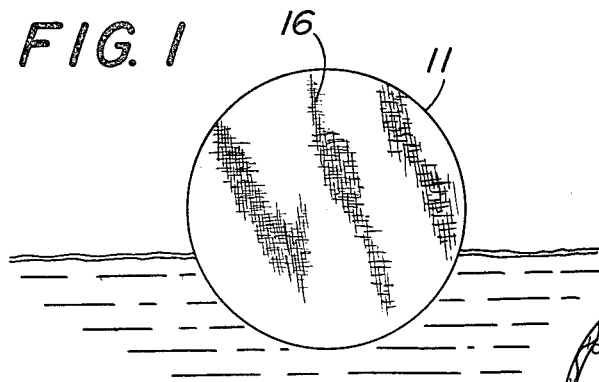
FIG. 1 is a plan view of a bag of polyisocyanurate foam floating on an oil spill.
Figure 2:
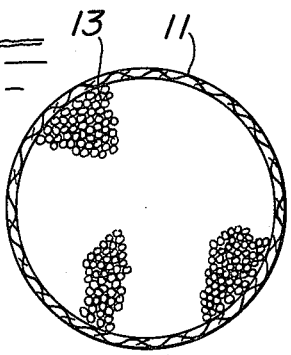
FIG. 2 is a cross-sectional view of a bag filled with polyisocyanurate foam particles.
Figure 3:
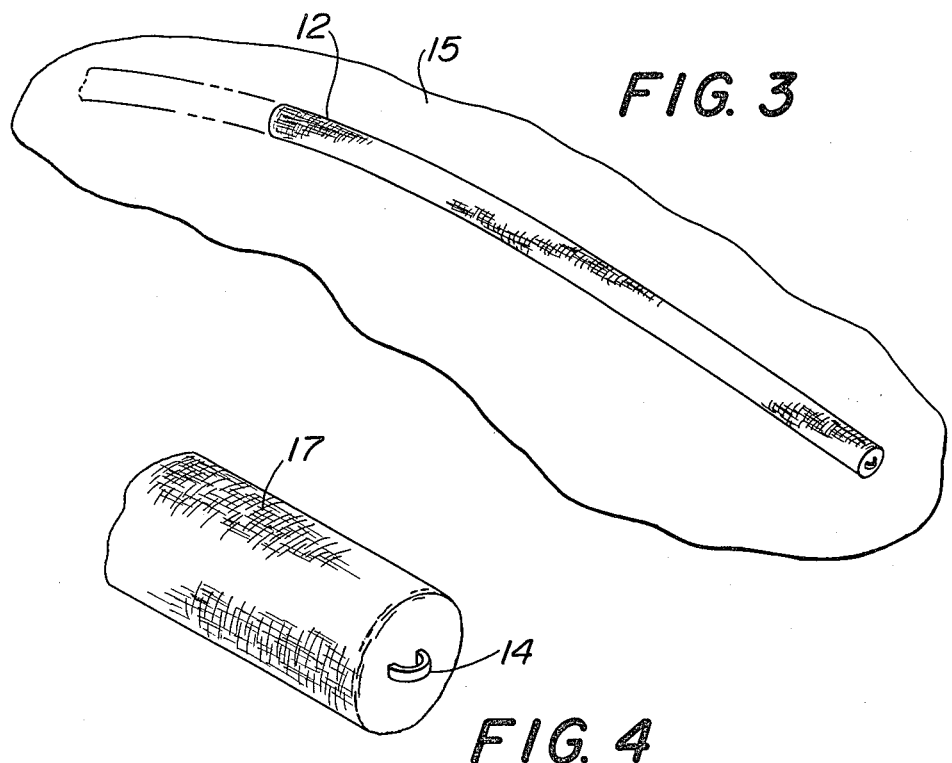
FIG. 3 is a plan view of a boom flled with polyisocyanurate foam floating on an oil spill.
Figure 4:
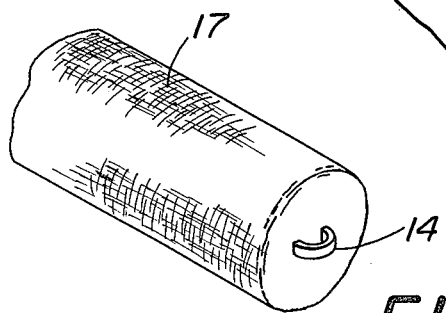
FIG. 4 is a partial plan view of one end of a boom showing a means for roping or chaining the booms together.

A shown in the drawings, the polyisocyanurate foam particles 13 are enclosed by a bag 11 or boom 12.

In either case, the bag or boom is made out of any porous material 16 which is not affected by oil or water, for example cheesecloth, muslin, cotton, polyethylene netting, and the like.

The bag can be spherical, oval, cubical, or any other convenient shape. The boom is essentially an elongated bag, and can have either a square or round cross section. The booms and bags are constructed of any convenient porous material 16 and 17.

The bags or booms are filled with chopped closed cell polyisocyanurate foam, hereinafter referred to as "dust." The dust is rather small, preferably about 1 to 5 cm. in diameter, and is obtained by chopping up polyisocyanurate foam, for example, by running it through auger blades. The foam density is preferably about 1.5 to 2.0 pounds per cubic foot.

The bags and booms are of any convenient size. They can be about 5 to 15 feet in diameter, or even larger, and the foams can be up to 200 feet long.

The booms preferably have an eye 14 for roping or chaining several booms together. By this method, an oil spill can be surrounded by a series of booms tied or chained together.

One of the great advantages to this invention is that oil 15 is picked up by the dust much more efficiently than polyurethane does, and the oil can be very efficiently recovered by squeezing the bags or booms between rollers. After recovery of the adsorbed oil in this way, the bags and booms are reuseable.

The bag and boom feature is an advantage because the dust is more adsorbent of oil than larger pieces of foam, and handling is much easier when the bags or booms are used. Furthermore, there is less of a fire hazard with the articles of the invention. They can be transported easily, and can be left permanently in a high spill area, or on oil rigs in the ocean.

A typical polyisocyanurate fomulation for making the dust used in the bags and booms of the invention is as follows (all figures are in parts by weight):

0.717 parts polymeric (polyaryl) isocyanate, for example "PAPI 580" of Upjohn Company, having an isocyanate equivalent of 139–140.
0.078 parts low molecular weight polyether polyol having a MW=40.
0.183 parts fluorocarbon blowing agent.
0.013 parts organosilicone blowing agent.
0.007 parts metallic carboxylate as catalyst.
0.003 parts tertiary amkne as catalyst.

Due to the large molar excess of isocyanate, trimerization to the isocyanurate ring structure takes place as the preferred reaction rather than forming a polyurethane structure.

The resultant foam is chopped into dust particles of about 1 to 5 cm. in diameter, then put into a cheesecloth bag, for example, of about 10 feet in diameter, and then placed on an oil spill. The oil is absorbed more quickly and efficiently than a bag in which polyurethane foam is substituted for the polyisocyanurate foam.

As is apparent from the above description, our invention provides a reliable and highly efficient method and apparatus for removing oil spills from water or even hard surfaces.

It will be understood that the foregoing description of the preferred embodiments of the invention is for the purpose of illustration only, and that the various process steps and relationships, as well as the proportions and sizes are susceptible to a number of modifications and changes which do not depart from the spirit and scope of the present invention as defined in the hereto appended claims.

What is claimed is:

1. Article for removing oil for surfaces comprising a bag or boom made of cloth or netting material, said material allowing the passage of oil therethrough, and filled with closed cell polyisocyanurate foam dust, said polyisocyanurate foam being formed from a polyol and a large molar excess of polymeric isocyanate so that trimerization to the isocyanurate ring structure takes place.

2. The article of claim 1 wherein the bag or boom is made of muslin, cotton, cheesecloth or polyethylene netting.

3. The article of claim 1 wherein the dust is chopped polyisocyanurate having an average diameter of about 1 to 5 centimeters.

4. Article of claim 1 wherein the closed cell polyisocyanurate foam has a density of about 1.5 to 2.0 pounds per cubic foot.

5. Article of claim 1 wherein the bags or booms have eyes on their ends for chaining or roping to adjacent bags or booms.

6. Method of cleaning up oil spills comprising applying bags or booms containing polyisocyanurate foam dust to the spill and recovering the bags or booms after adsorbing oil, said polyisocyanurate foam being formed from a polyol and a large molar excess of polymeric isocyanate so that trimerization to the isocyanurate ring structure takes place.

7. Method of claim 6 wherein the bags or booms are squeezed to recover the oil which they had adsorbed.

8. Method of claim 6 wherein the booms or bags are chained or roped together prior to applying them to the spill.

* * * * *